Feb. 2, 1937.  L. G. PICKHAVER ET AL  2,069,623

ARC WELDING

Filed May 17, 1932

Inventors:
Lionel G. Pickhaver,
William W. Worley, Jr.
by Charles E. Tullar
Their Attorney Patented Feb. 2, 1937

2,069,623

UNITED STATES PATENT OFFICE 2,069,623

ARC WELDING

Lionel G. Pickhaver and William W. Worley, Jr., Chicago, Ill., assignors to General Electric Company, a corporation of New York Application May 17, 1932, Serial No. 611,858

13 Claims. (Cl. 219—8)

Our invention relates to arc welding, and particularly to arc welding machines for automatically feeding coated welding electrodes toward and away from the work to strike and thereafter maintain a welding arc.

In order to improve their arcing characteristics as well as the quality of the weld metal, welding electrodes are often coated with materials called fluxes. Very often these coatings are of considerable thickness, and electrically insulate the electrodes rendering them unsuited for use in automatic machines in which the welding current is fed to the surface of the electrode at a predetermined point as it is fed through the machine to the work. Heavy coated electrodes are generally supplied in short lengths with one end thereof bared for insertion in a holder by means of which current is fed thereto.

It is an object of our invention to provide a welding machine for feeding heavily coated welding electrodes of considerable length into and out of engagement with the work to strike and thereafter maintain an arc and for supplying welding current to said electrodes as they are fed to the work.

It is another object of our invention to provide a current collecting means for electrodes having longitudinal openings in their flux coatings by means of which a continuous contact with the electrode is provided.

It is a further object of our invention to provide means for producing a longitudinal cut through the coating of a fluxed electrode by means of which a line of contact is cleaned for a current collecting means which makes a continuous contact with the metal of the electrode.

Figure 1:
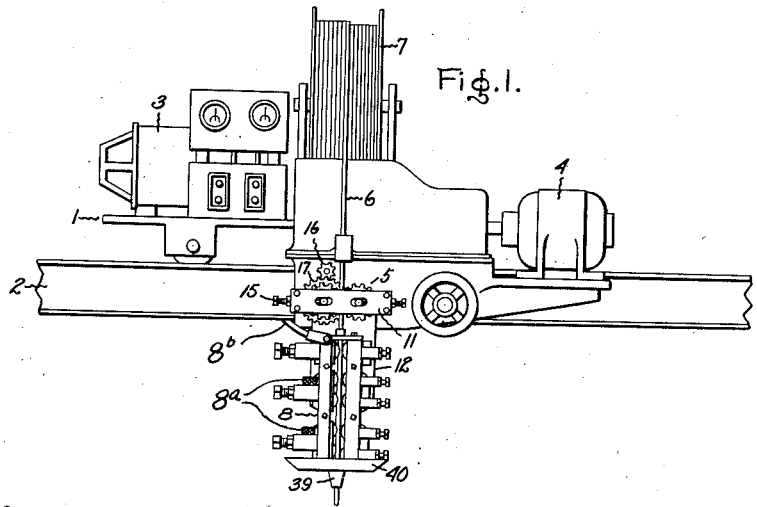
Figure 2:
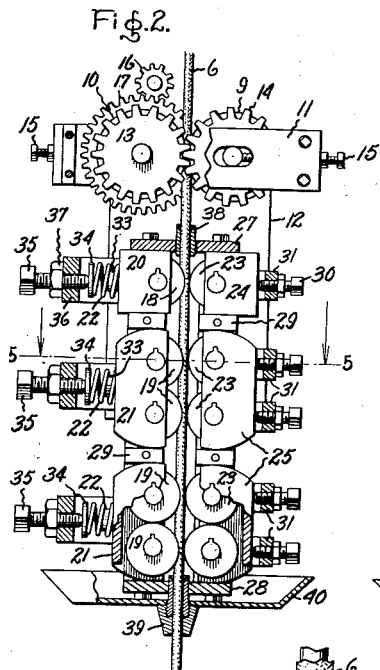
Figure 3:
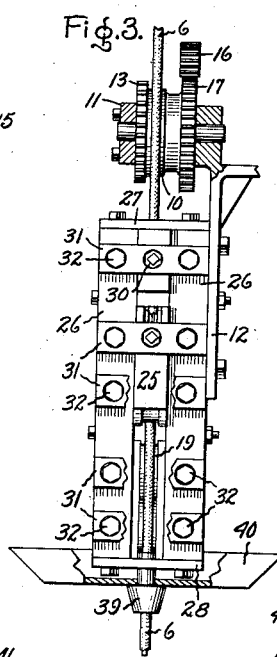
Figure 4:
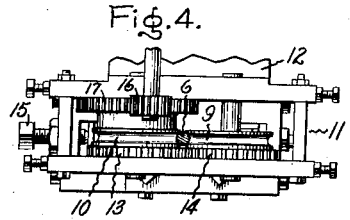
Figure 5:
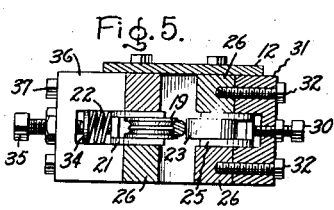
Figures 8, 9, 10:
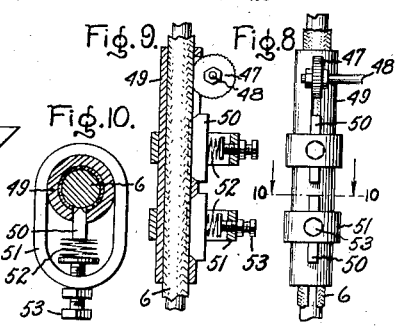
Figure 7:
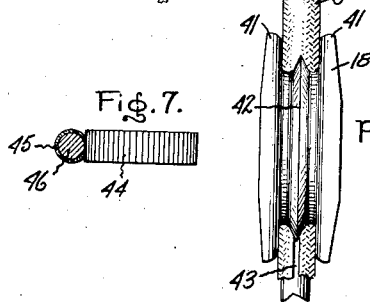
Figure 6:

Further objects of our invention will become apparent from the following description taken in connection with the accompanying drawing in which Fig. 1 is a partial view of an automatic arc welding machine embodying one form of our invention; Figs. 2 and 3 are front and side views partially in section and Fig. 4, a top view of the electrode feeding and current collecting mechanism illustrated in Fig. 1; Fig. 5 is a sectional view along the line 5—5 of Fig. 2; Fig. 6 is an enlarged view of the flux cutting roller employed in the collector mechanism illustrated in Figs. 1 to 5 inclusive; Fig. 7 is an illustration of a modified form of backing up roll which may be employed in the feeding and collector mechanism illustrated, and Figs. 8, 9, and 10 are front, side sectional and cross sectional views of a modified form of current collector embodying the features of our invention. The cross sectional view of Fig. 10 is taken along the line 10—10 of Fig. 8.

In Fig. 1 the welding head is mounted on a carriage 1 supported on a track 2 along which it is propelled by traversing motor 3 to perform a welding operation on work (not shown) located below the track. The welding head comprises a feed motor 4 by means of which the feeding mechanism 5 is operated in the proper direction and at the proper speed to feed an electrode 6 from a supply roll 7 through the current collector 8 to strike and thereafter maintain a welding arc. In automatic machines the operation of the feed motor 4 or of a transmission connecting the feed motor to the feeding mechanism is made to function in accordance with a characteristic of the welding arc to control the speed and direction of electrode feed. Any suitable control mechanism may be used to accomplish this result.

The electrode feeding mechanism and current collector of Fig. 1 are shown in detail in Figs. 2, 3, 4, 5, and 6. The electrode feeding mechanism comprises feed rolls 9 and 10 which are supported in a framework 11 forming part of a bracket 12 which is attached to the welding head. The feed rolls 9 and 10 are positively connected by intermeshing gears 13 and 14 and are adjusted relatively to one another and the electrode 6 by means of set screws 15 supported in a framework 11 and acting on the axles of the feed rolls and gears. The feed rolls are rotated by means of a gear 16 which meshes with a gear 17 mounted on the same axle as the feed roll 10 and gear 13. Gear 16 is connected directly or through the agency of a regulable transmission to the feed motor 4. When the feed motor 4 is connected directly to the gear 16 the speed of the motor is controlled in accordance with a characteristic of the welding circuit to control the rate and direction of electrode feed to strike and maintain the welding arc. When the gear 16 is connected with feed motor 4 through the agency of a regulable transmission, the feed motor 4 may be a constant speed motor and the variation in speed and direction for feeding the electrode to strike and maintain the arc may be obtained by suitably controlling the transmission. Such arrangements are well known in the art and, consequently, will not be further described. The feed rolls 9 and 10 are preferably grooved and may have their electrode engaging surfaces corrugated in order to secure a more positive engagement with the electrode. They may be provided with treads of hard rubber and the like in order to secure the desired traction between the electrode and the feed rolls.

The particular current collector illustrated in Figs. 2, 3, and 5 comprises a flux cutting roll or roller 18 and four conducting rolls or rollers 19 supported in yokes 20 and 21 and forced into engagement with the electrode by means of springs 22 acting against these yokes. Conducting rolls 19 are connected to a source of welding current through connections 8a (Fig. 1) forming a part of the current collector 8 which is connected to said source through a conductor 8b, the terminal of which is attached thereto. Means are provided for insulating the cutting roll 18 from the source of welding current so that the edge of the cutting roll is not destroyed by the sparking engagement which it may otherwise make with the metal of the electrode. At points opposite the points of engagement of rolls 18 and 19 with the electrode 6 a plurality of backing-up rolls or rollers 23 are provided for holding the electrode in place against the pressure exerted on it by the cutter and collector rolls. These backing-up rolls are supported in yokes 24 and 25 which together with yokes 20 and 21 for the cutter and collector rolls are supported in a framework comprising four columns 26, end plates 27 and 28, and spacing members 29. This framework is attached to the bracket 12 which positions the collector mechanism relative to the feeding mechanism and the welding head. The position of the backing-up rolls 23 in the framework above referred to is determined by the adjustment of set screws 30 located in yokes 31 and engaging yokes 24 and 25 in which the backing-up rolls are located. The yokes 31 are attached to the columns 26 of the framework previously referred to by screws 32. The pressure exerted on these rolls by the electrode is determined by the adjustment of springs 22. One end of these springs fits over bosses 33 on the yokes 20 and 21, and the other end fits over a cup-shaped washer 34 to which pressure is applied by set-screws 35. These set-screws are supported in yokes 36 which are secured to columns 26 by screws 37. The electrode 6 enters the current collector through a bushing 38 and is directed therefrom through a bushing 39 inserted in a shield 40 interposed between the arcing terminal of the electrode and the collector.

It will be noted that the contact device above described comprises a plurality of vertically spaced roller chambers within which are pairs of horizontally movable rollers which are urged constantly or uninterruptedly toward one another by means acting on the supports for these rollers and our invention has been so defined in some of the annexed claims.

The cutter roll is preferably of the construction illustrated in the enlarged view thereof in Fig. 6. As there illustrated it comprises a grooved roll having lips 41 which engage the fluxed surface of the electrode and a knife-edged cutting rib 42 located in the base of its groove. When the cutting roll is forced against the electrode the knife-edged rib 42 cuts or parts the coating of the electrode forming a longitudinal opening 43 in the electrode which exposes the material of the electrode. The collector rolls 19 are essentially of the same construction as the cutter roll 18, with the exception that the current collecting rib corresponding to the cutting rib 42 of cutting roll 18 is not provided with a knife-edged surface, although such a construction may be employed. The yokes 20 and 21 which carry the cutting roll and collector rolls are free to float in the framework in which they are located, so that as the electrode is fed through the collector the lips of the cutting roll and collector rolls engage it and insure alignment of the cutting and contact portions of these rolls so that the current collecting rib of the collector roll follows in the longitudinal opening produced in the flux coating of the electrode by the cutting rib of the cutting roll.

The backing-up rolls 23 are preferably provided, as illustrated in Figs. 2, 3, and 5, with flat surfaces. They may, however, be provided with grooved surfaces. In cases where the fluxing material readily separates from the electrode, toothed rolls may be used for the feed roll 9 and the backing-up rolls 23. When toothed rolls are used the feed roll will cut through the flux of the electrode and, as the electrode passes through the current collector, pressure will be applied directly to the electrode through the teeth on the backing-up rolls rather than to the coating on the electrode. A toothed roll suitable for this purpose is illustrated at 44 in Fig. 7 which shows the manner in which the teeth of the roll cut through the flux coating 45 of the electrode and engage the electrode 46.

In place of the rotating cutter described above, a knife-edged block may be used to slit the covering on the electrode. A reciprocating saw may also be used for this purpose. In place of the collector wheels in the above-described device a sliding shoe may be employed for making a continuous contact with the electrode. A modification embodying a rotating saw and sliding shoe collectors is shown in Figs. 8, 9, and 10. In these figures a saw or milling cutter 47 driven by power supplied through a shaft 48 is located relatively to a hollow sleeve 49 through which the electrode 6 is fed so as to produce a longitudinal slit in the covering of the electrode to bare a portion thereof as it is fed through this sleeve. Current is supplied to the electrode through the opening thus produced by shoes 50 which are connected to a suitable source of current. These shoes are held in place relative to the sleeve 49 by yokes 51 between which and the shoes are springs 52. The tension of these springs and, consequently, the contact pressure of the shoes 50 are determined by the adjustment of set screws 53 located in yokes 51. Because of the lesser amount of friction obtained with rolling contacts, sliding contacts are not preferred, but they may be used without departing from the spirit and scope of our invention. A single rolling or sliding contact may be provided for cutting the flux coating and conducting welding current into the electrode, although we prefer to use separate devices for performing these two functions.

It is not necessary to groove the cutting and feeding rolls in the modification above illustrated and described, but improved results are obtained if these rolls are provided with lips which engage the electrode and act to align the cutting and current collector portions of the cutting and collecting rolls. It is not necessary that the longitudinal opening produced in the surface of the fluxed electrode be rectilinear since other types of groove may be used without departing from our invention. For example, a spiral groove could be used. If a spiral groove is used it is necessary to rotate the collector and electrode relatively to one another and, consequently, it is preferable to use a rectilinear opening in the flux coating in order to simplify the apparatus used. The electrode may be supplied with a longitudinal opening therein in which case the cutter mechanism associated with the current collecting mechanism in the devices above described need not be used. They may, however, be retained to serve the function of guiding the electrode relative to the collector mechanism in order to insure registry of the electrodes with the collector mechanism upon passing through the device. These and other modifications will occur to those skilled in the art.

In the particular arrangement illustrated the mechanisms are essentially attachments which can be associated with automatic machines adapted for feeding bare electrodes in order to render them suitable for feeding heavily fluxed electrodes. It is of course apparent that the means illustrated may form an integral part of the welding head, and such modifications are contemplated.

What we claim as new and desire to secure by Letters Patent of the United States, is,—

1. Arc welding apparatus comprising means for feeding a coated electrode, a cutting roll, a current collecting roll, means for forcing said rolls into successive longitudinal engagement with said electrode with said collecting roll in the longitudinal cut produced by said cutting roll, and means for connecting a source of welding current to said current collecting roll.

2. Arc welding apparatus comprising means for feeding a coated electrode, a knife-edged cutting roll, means for forcing the cutting edge of said roll into longitudinal engagement with said electrode through the coating on said electrode, a current collecting roll having a rib adapted to engage said electrode through the longitudinal opening made in its coating by said cutting roll, means for forcing said collector roll into engagement with said electrode, and means for connecting a source of welding current to said collector roll.

3. Arc welding apparatus comprising means for feeding a coated electrode, a knife-edged cutting roll, means for forcing the cutting edge of said roll into longitudinal engagement with said electrode through the coating on said electrode, a current collecting roll having a rib adapted to engage said electrode through the longitudinal opening made in its flux by said cutting roll, means for forcing said collector roll into engagement with said electrode, means for connecting a source of welding current to said collector roll, and means for insulating said cutting roll from said source of welding current.

4. Arc welding apparatus comprising means for feeding a coated electrode, a cutting roll and a current collecting roll having lips adapted to engage the electrode and insure alignment of their cutting and contact portions, and means for forcing said rolls into longitudinal engagement with said electrode with the contact portion of said collecting roll in the longitudinal cut produced by said cutting roll.

5. Arc welding apparatus comprising means for feeding a coated electrode, a grooved flux cutting roll having a cutting rib at the bottom of its groove, a grooved current collecting roll having a conducting rib at the bottom of its groove, means for forcing said rolls into longitudinal engagement with said electrode with said conducting rib of said collector roll in the longitudinal cut produced by said cutting roll, and means for connecting a source of welding current to said conducting rib.

6. Arc welding apparatus for flux coated electrodes comprising a feed roll, means for rotating said feed roll, an electrically insulated flux cutting roll, a current collecting roll, means for forcing said rolls into longitudinal engagement with said electrode with said collecting roll in the longitudinal cut produced by said cutting roll, means for connecting a source of welding current to said current collecting roll, and means for supporting said electrode at points opposite the points of contact of said rolls with said electrode.

7. Arc welding apparatus comprising means for feeding a flux coated electrode, a flux cutting roll, a current collecting roll, means for forcing said rolls into successive longitudinal engagement with said electrode with said current collecting roll in the longitudinal cut produced by said flux cutting roll, means for connecting a source of welding current to said current collecting roll, means for producing openings in the flux coating of said electrode at points opposite said longitudinal cut, and means engaging said electrode through said openings for supporting said electrode at points opposite the points of contact of said collecting and cutting rolls with said electrode.

8. Arc welding apparatus for flux coated electrodes comprising a feed roll, means for rotating said feed roll, a flux cutting roll, a current collecting roll, means for forcing said rolls into longitudinal engagement with said electrode with said current collecting roll in the longitudinal cut produced by said cutting roll, means for connecting a source of welding current to said current collecting roll, and a plurality of toothed rolls for cutting through said coating and supporting said electrode at points opposite the points of contact of said feeding, cutting and collecting rolls with said electrode.

9. Arc welding apparatus comprising means for feeding a coated electrode, flux cutting and current collecting rolls having cutting and contact edges and lips adapted to engage the surface of the electrode and align said cutting and contact edges of said rolls relatively to said electrode, means for forcing said rolls into longitudinal engagement with said electrode with said current collecting roll in the longitudinal cut produced by said cutting roll, and means for supporting said electrode for the aligning movement imparted thereof by the engagement therewith of the lips of said rolls.

10. Arc welding apparatus comprising means for feeding a flux coated electrode, a flux cutting roll and a current collecting roll in longitudinal engagement with said electrode with said collecting roll in the longitudinal cut produced by said cutting roll, backing rolls for engaging the electrode opposite said cutting and current collecting rolls, yokes for said rolls, a framework for supporting said yokes, means in said framework for applying a yielding pressure to the yokes for said cutting roll and said current collecting roll, means in said framework engaging the yokes for said backing rolls for adjusting said backing rolls relatively to said electrode, means for electrically insulating said cutting roll, and means for supplying welding current to said collecting roll.

11. In electric arc welding apparatus, a contact device comprising a plurality of vertically spaced roller chambers, a pair of rollers in each of said chambers, and means for uninterruptedly urging said rollers toward each other.

12. In electric arc welding apparatus, a contact device comprising a plurality of vertically spaced roller chambers, a pair of roller supports in each of said chambers, a roller mounted on each of said supports, and means for uninterruptedly urging said roller supports towards each other.

13. In electric arc welding apparatus, a contact device comprising a plurality of vertically spaced pairs of rollers, means supporting said rollers for horizontal movement relative to one another, and means for constantly urging the rollers of each of said pairs toward one another.

LIONEL G. PICKHAVER.
WILLIAM W. WORLEY, Jr.